Figure 1:
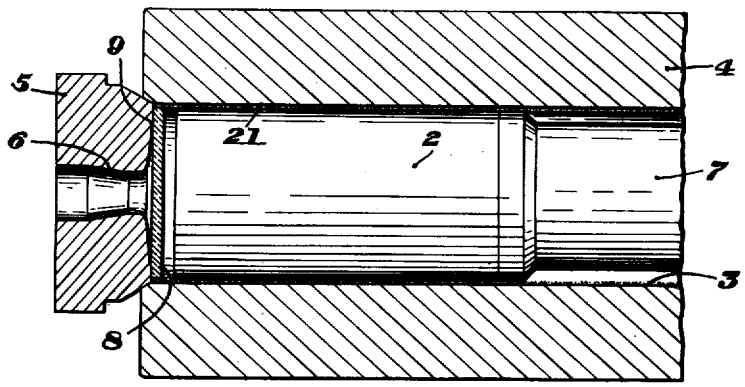

Jan. 23, 1951   J. SEJOURNET ET AL   2,538,917
EXTRUSION OF METAL
Filed May 19, 1948

INVENTORS
JACQUES SEJOURNET &
LOUIS LABATAILLE

Patented Jan. 23, 1951

2,538,917

UNITED STATES PATENT OFFICE 2,538,917

EXTRUSION OF METALS

Jacques Sejournet, Paris, and Louis Labataille, Houilles, France, assignors to Comptoir Industriel D'Etirage et Profilage de Metaux, Paris, France, a corporation of France Application May 19, 1948, Serial No. 27,974
In France November 22, 1941

3 Claims. (Cl. 207—10)

This invention relates to the extrusion of metals and alloys having melting points above 900° C. and which accordingly require high extrusion temperatures and pressures.

This application is a continuation-in-part of our application Serial No. 597,266, filed June 2, 1945, and now abandoned.

A large number of metals and alloys, for example, lead, zinc and aluminum, which have relatively low melting points, lend themselves readily to extrusion in a heated state. On the contrary, when one attempts to extrude other metals or alloys which are less malleable or which are malleable only at distinctly higher temperatures, as for instance steel, the operation becomes difficult and can be performed commercially only at very high extruding pressures which result in rapid wear of the dies. These difficulties are chiefly due to the heating of the dies and the friction which they undergo, as well as to the friction occurring between the workpiece, such as an ingot or billet to be extruded and the container, and in the case of extruding hollow articles such as tubes due to friction between the workpiece and the mandrel. The friction not only causes deformation, wear and deterioration of the dies, containers and mandrels, but also considerably increases the energy necessary for the extrusion and results in defects in the products obtained.

Among the metals and alloys which have melting points above 900° C. and which can be satisfactorily extruded according to the present invention are steel and steel and iron alloys, nickel and nickel-rich alloys, copper and copper rich alloys and in general iron-free alloys or alloys low in iron containing substantial amounts of one or more of the alloying elements, nickel, cobalt, chromium, tungsten and molybdenum.

In practice, the extrusion of metals having high melting points and which are difficult to extrude, as for example steel, by means known prior to our invention, requires very frequent repairing of the dies and other tool implements such as containers and mandrels which contact with the workpiece, and the efficiency of such methods is very low; and the surface of the extruded goods is often not satisfactory. Furthermore the surface of the so extruded goods is often not as smooth as is required. Various lubricants have been employed but they have not proved satisfactory in extruding steel or other metals or alloys which must be extruded at high temperatures and pressures. The use of lubricants such as oil, either alone or mixed with graphite or pitch or other materials which burn only at a high temperature, does not yield satisfactory results. This is true also of the use of materials which remain solid at the extrusion temperature, as for instance talc or fine grain calcium carbonate.

In accordance with the present invention, a heated metal workpiece having a melting point above 900° C. is extruded from an extrusion chamber having a die at one end, the die having an opening through which the workpiece is extruded. We insert between the die and the heated workpiece a layer of material which is incombustible but is fusible at the extrusion temperature and which has a wide melting range as contrasted with a true melting point. Suitable materials are glass, slags and a limited number of salts. The incombustible but fusible material which is inserted between the die and the workpiece must have a wide range of temperatures over which it becomes progressively more mobile while still remaining viscous, as contrasted with a material which has a true melting point and which accordingly changes rapidly with changes in temperature from a solid to a melted condition. The material inserted between the die and the workpiece has a viscous range as contrasted with a true melting point. Glasses, slags and a limited number of salts are suitable for our purposes. Ordinary window glass is a satisfactory material. Slags which have a wide viscous range are also satisfactory, as for instance a slag containing—

| | Percent | | Percent |
|---|---|---|---|
| SiO₂ | 54 | CaO | 5.4 |
| Na₂O | 27 | Al₂O₃ | 3.4 |
| B₂O₃ | 10 | | |

There also are a limited number of salts which have a viscous range as contrasted with a true melting point and which are satisfactory for insertion between the die and the heated workpiece. Included in such type of salts are sodium borate, sodium metaphosphate and sodium silicates.

In the accompanying drawings which illustrate present preferred embodiments of our invention.

Figure 2:
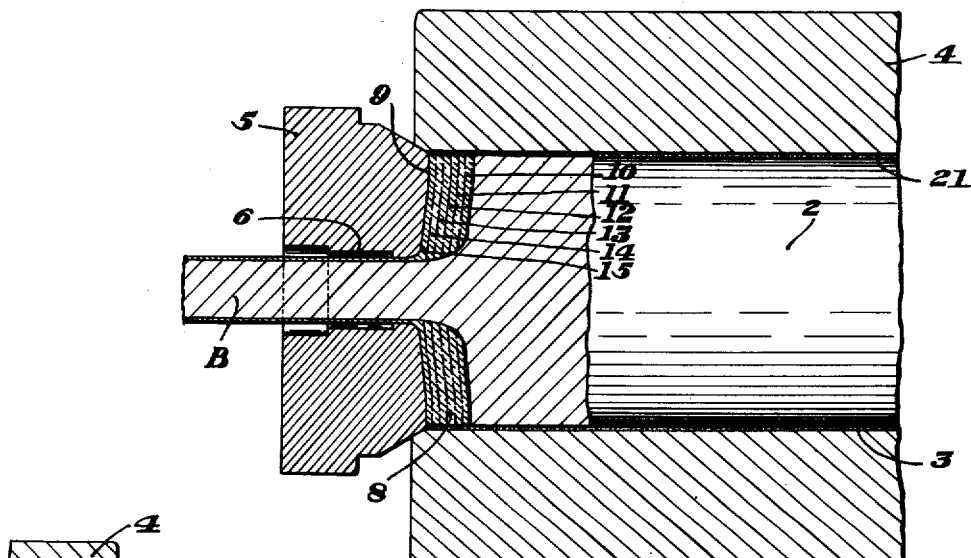
Figure 3:
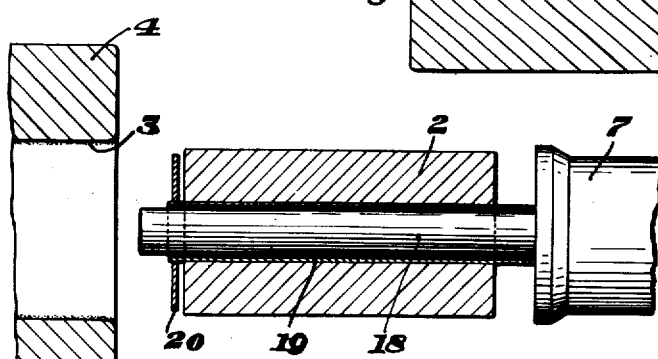

Figure 1 is a partial longitudinal vertical section through the container of an extrusion press and also showing the die for extruding a solid bar;

Figure 2 is an enlarged view of a part of Figure 1 illustrating in a somewhat diagrammatic manner the way in which a layer of glass inserted between the die and the workpiece operates to lubricate the die, the thickness of the layer of glass being greatly exaggerated in this figure; and Figure 3 is a view similar to Figure 1 illustrating the manner in which the various pieces involved are located before they are introduced in the container in the case of the extrusion of a tube.

Referring more particularly to the accompanying drawings, a steel workpiece 2, such as an ingot or billet, is received in an extrusion chamber 3 formed by a container 4. A die 5 is located at one end of the extrusion chamber and has a die opening 6 through which the bar is to be extruded by pressure applied to the workpiece by a punch 7. Reference numeral 8 designates a plate of glass which is placed between the die 5 and the workpiece 2 and which rests against a ledge 9 surrounding the die opening 6. In carrying out an extrusion, the glass plate 8 is placed between the die and the workpiece so that the plate surrounds the die opening. In the illustrated embodiment the glass plate not only surrounds the die opening but covers it, but it would be sufficient if the plate was annular in form and merely surrounded the die opening, provided the annular plate covered the major portion of the ledge 9. After placing the glass plate in the extrusion chamber 3, the workpiece, heated to extrusion temperature, is introduced into the extrusion chamber and pressure is applied to the punch to force the workpiece through the die opening. The workpiece is extruded at such rate that the surface of the glass layer which is adjacent the workpiece melts continuously and under the pressure employed flows continuously through the die opening around the article being extruded while the opposite surface of the glass layer remains substantially solid.

The manner in which the glass plate 8 lubricates the die is illustrated in Figure 2. The workpiece heated to say 1200° C. is in contact with the surface 10 of the glass plate 8, while the other surface 15 is in contact with the die 5 which may be at a temperature of say 300° C. as a result of a previous operation. Accordingly there is a temperature gradient in the glass plate. As the extrusion operation proceeds, the surface 10 of the plate which is in contact with the heated workpiece melts and is ejected through the die opening around the bar B. The film of glass which is in immediate contact with the workpiece may be so fluid as to offer insufficient protection for the die, but since there is a temperature gradient in the plate 8 the films 11, 12, 13, 14 and 15 are of progressively less fluidity or, stated otherwise, the films 11, 12, 13, 14 and 15 are of progressively greater viscosity. The applied pressure eliminates the films which are of insufficient viscosity to effectively protect the die and an equilibrium is automatically established between the pressure required for ejection of the glass film and the resistance corresponding to the viscosity of the remaining films. Thus at any given instant in the extrusion operation a film which is too fluid to offer effective protection to the die is ejected but there is available adjacent to this too fluid film a film having a viscosity which is proper for flowing continuously through the die opening, around the bar, and offering effective protection to the die. In carrying out the extrusion operation the workpiece is extruded at such rate that the surface of the glass layer which is adjacent the workpiece melts continuously and under the pressure employed flows continuously through the die opening around the article being extruded, while the surface 15 of the glass layer remains substantially solid. At the end of the extrusion operation a portion of the glass plate which is substantially solid remains in the extrusion chamber.

Extrusion of a tube instead of a bar is illustrated in Figure 3. In this figure parts corresponding to those in Figure 1 are correspondingly numbered. The heated workpiece 2 is cylindrical instead of being solid and is placed on a mandrel 18 secured to the punch 7. A glass tube 19 is placed between the mandrel and the inside surface of the steel cylinder 2. A glass plate 20 also is secured to the front end of the tube 19. The whole assembly is then inserted into the container 4 in the bottom of which a die such as the die 5 of Figures 1 and 2 is arranged. Application of pressure to the workpiece 2 by the punch 7 causes a tube to be extruded through the die 5.

Whether a bar or a tube is extruded, the pressure exerted by the punch 7 causes the extrusion through the die of a bar or tube of metal covered by a thin layer of previously molten and then solidified glass which can be easily removed from the extruded article.

In place of the glass plate 8 we may employ a plate of slag or salt having a viscous range. Instead of employing a previously formed plate of material we may form the layer of fusible material by applying to the ledge 9 or to the leading end of the workpiece a solution or suspension of the fusible material so that upon evaporation of the solution a layer of the fusible material is deposited either on the die or the end of the workpiece. The thickness of the plate or layer 8 is preferably chosen greater than is practically necessary for providing the amount of incombustible fusible material which has to be extruded together with the extruded metallic product. The use of a layer 8 in the form of a previously cast or molded plate is in most cases particularly advantageous. The fusible material forms a true lubricating sheath which insulates the metal from the die and/or the mandrel.

The friction between the workpiece 2 and the container 4 can be reduced by inserting a lubricant 21 between the workpiece and container. The lubricant between the workpiece and the container need not be of the same character as that which is required between the die and the workpiece. As far as lubricant between the workpiece and container is concerned, salts such as barium chloride, sodium chloride and magnesium chloride are very satisfactory. These salts have true melting points instead of having a viscous range. They are additionally advantageous in that they dissolve oxides which may be on the surface of the workpiece and which otherwise would cause defects in the extruded product.

Another class of lubricants for employment between the workpiece and the container comprises materials having a melting range which is narrower than glass but which nevertheless differs from salts having a true melting point. Examples of materials having a narrow melting range are borax, sodium metaphosphate and sodium silicates. These materials also have the property of dissolving oxides of the metal being extruded.

Another class of materials that can be used between the workpiece and the container are glasses and slags which have a wide viscosity range. Glasses have the property of dissolving metal oxides and this is also true of certain slags.

Another class of material which can be employed as a lubricant between the workpiece and container comprises materials which remain solid at the extrusion temperature, for example talc or aluminum silicate. These materials do not have the property of dissolving oxides and therefore where they are employed and where the surface of the extruded article is of importance the workpiece before extrusion should be freed of scale. One method of doing this is to heat the workpiece in hydrogen or other reducing gas.

The materials which are employed between the workpiece and the container could be used in the form of a tube surrounding the workpiece, but it is preferable to coat the inside of the container by application of the lubricant in the form of a powder or in the form of a solution or suspension in a fluid which evaporates in contact with the ingot or container. By way of example, a coating of powdered borax yields very good results in the extrusion of steel or copper.

Another way of providing a lubricant between the workpiece and the container is to immerse the workpiece in a bath of molten salt, as for example a molten heat-treating salt bath of barium chloride, which in addition to providing the lubricant may preheat the workpiece.

Before inserting a lubricant between the workpiece and the container, it is advantageous to free the ingot surface from any oxides when such oxides are present notably when the metal workpiece has been treated in an oxidizing medium. This can be done by rolling the ingot in a pulverulent deoxidizing or dissolving mixture, such as borax, and then removing the oxide layer by striking or scraping it and by finally brushing the ingot with a metallic brush.

The present invention has among others the following advantages:

1. For a given extrusion temperature, the extrusion pressure can be considerably reduced. The insertion of a lubricating layer of glass or slag of the kind herein referred to between the workpiece and the die reduces the required pressure about 25 to 30%. If in addition to the glass or slag layer between the workpiece and the die a lubricating layer of borax is inserted between the workpiece and the container, the required pressure is further reduced about 15 to 20% making a total reduction of about 40 to 50% of the working pressure.

2. Conversely, if pressures normally required to extrude steel are employed in our process, the temperatures can be considerably reduced so that the extruded metal is not subject to the likelihood of being overheated.

3. The temperature and pressure can be reduced simultaneously.

4. If the fusible body which is used between the die and the workpiece has a low heat conductivity, the die is thermally insulated from the hot metal, is subjected to a lesser heat and consequently deforms less, and this feature is independent of the decrease of the pressures and temperatures necessary to be used. This means perfect control of the dimensions of the bar or tube and reduction in frequency and extent of die repair and maintenance. The same considerations hold true for the other rubbing parts of the extrusion press and accordingly it is no longer necessary, as was hitherto the usual practice, to bring the dies, mandrels and containers to a comparatively high temperature before their use in order to avoid flaws in the extruded product.

5. The working surface of the die remains perfectly smooth and the bar or tube leaves the die without any scratches. After cooling it is covered with a thin layer of the fusible material, which layer can be easily removed. Subsequent cold drawing of the bars or tubes yields products which are very clean and practically without flaws.

6. The yield of extruded products is increased.

The following are examples of the prior art and of the present invention.

*Example I*

Workpiece—extra mild steel (0.15% carbon)
Diameter of workpiece—100 mm.
Length of workpiece—200 mm.
Extrusion temperature—1100° C.
Extrusion time—about 3 seconds
Diameter of extruded bar—25 mm.
Lubrication—interior of container coated with grease.

The first half of the bar was well informed without scratches, but the second half of the bar was scratched. The die had to be repaired after the first extrusion. The average extrusion pressure was 52 kg./sq. mm.

*Example II*

The conditions were the same as in Example I except that the inner wall of the container was coated with borax.

The bar was slightly scratched. The average extrusion pressure was 43 kg./sq. mm.

*Example III*

The conditions were the same as in Example II except that in addition a glass plate of 4 mm. thickness was placed between the die and workpiece.

The extruded bar was without a scratch. The average extrusion pressure was 29 kg./sq. mm. and the die remained absolutely intact.

*Example IV*

Workpiece—ordinary half-hard carbon steel (0.25% carbon)
Diameter of workpiece—100 mm.
Length of workpiece—200 mm.
Extrusion temperature—1100° C.
Extrusion time—about 3 seconds
Diameter of extruded bar—25 mm.
Lubrication—interior of container coated with grease The bar was slightly scratched. The die had to be remachined after the first extrusion. The average extrusion pressure was 58 kg./sq. mm.

*Example V*

The conditions were the same as in Example IV except that the interior of the container was coated with borax and a glass plate 4 mm. thick was placed between the die and the work-piece.

The extruded bar was without a scratch. The average extrusion pressure was 42 kg./sq. mm. The die remained absolutely intact.

*Example VI*

The conditions were the same as in Example V except that a plate of borax was used in place of a glass plate between the die and the workpiece.

Substantially the same results were obtained as in Example V.

Example VII

Workpiece—stainless steel (18% chromium-8% nickel)
Diameter of workpiece—100 mm.
Length of workpiece—200 mm.
Extrusion temperature—1125° C.
Diameter of extruded bar—25 mm.
Lubrication—interior of the container coated with grease.

Only half of the workpiece extruded in spite of an extrusion pressure of 71 kg./sq. mm.

Example VIII

The conditions were the same as in Example VII except that the interior of the container was coated with borax in place of the fatty body and a glass plate of 4 mm. thickness was placed between the die and the workpiece.

The workpiece extruded rapidly and the extruded bar was without a scratch. The average extrusion pressure was 42 kg./sq. mm. and the die remained absolutely intact.

Example IX

Workpiece—copper
Diameter of workpiece—100 mm.
Length of workpiece—400 mm.
Extrusion temperature—950° C.
Cross-section of extruded bar—60 mm. x 6 mm.
Lubrication—interior of the container coated with grease.

The extrusion pressure was 63 kg./sq. mm. After the extrusion of four workpieces the die was deformed in the middle and required repairing.

Example X

The conditions were the same as in Example IX except that the interior of the container was coated with borax in place of the fatty body.

The same deformation of the die occurred but the extrusion pressure was lowered to 55 kg./sq. mm.

Example XI

The conditions were the same as in Example X except that a glass plate 4 mm. thick was placed between the die and the workpiece.

No deformation of the die occurred and the average extrusion pressure was reduced to 38 kg./sq. mm.

Example XII

Workpiece—extra mild steel 0.15% carbon
Diameter of workpiece—120 mm.
Length of workpiece—600 mm.
Extrusion temperature—1150° C.
Extrusion time—4 seconds
Dimensions of extruded bar—50 mm. x 25 mm.
Lubrication—no lubrication between the workpiece and container or between the die and workpiece.

The extrusion pressure was 90 kg./sq. mm. There were very deep scratches from end to end of the bar, the scratches being deeper at the end of the bar which was last extruded. The die had to be repaired after one extrusion.

Example XIII

The conditions were the same as in Example XII except that the workpiece was lubricated by dipping it into a molten bath of barium chloride. This treatment lowered the pressure required to 75 kg./sq. mm. The first two meters of the extruded bar were free from scratches but then scratches appeared which became deeper toward the end of the bar last extruded. The die had to be repaired after one extrusion.

Example XIV

The conditions were the same as in Example XIII except that in addition to the barium chloride lubricant between the workpiece and the container, the die was lubricated by placing a plate of slag 4.5 mm. thick between the die and the workpiece, the slag having the analysis:

| | Percent | | Percent |
|---|---|---|---|
| $SiO_2$ | 72 | MgO | 2 |
| $Na_2O$ | 11 | $Al_2O_3$ | 2 |
| $K_2O$ | 1 | $Fe_2O_3$ | 1 |
| CaO | 10 | MnO | 1 |

The extrusion pressure required was lowered to 70 kg./sq. mm. The bar was without a scratch and the die remained absolutely intact.

Tubes can be made in place of bars by employing a mandrel, as shown in Figure 3, and any of the lubricants which are suitable in the production of bars can be employed in the production of tubes.

The following are examples of glasses which may be placed between the die and the workpiece in carrying out our extrusion method.

Table 1

| | (1) | (2) | (3) | (4) | (5) |
|---|---|---|---|---|---|
| $SiO_2$ | 71.6 | 74 | 68 | 69.3 | 67 |
| $Na_2O$ | 14.3 | 16.5 | 8.4 | 14.3 | 13 |
| $K_2O$ | 0.6 | | | | 7 |
| CaO | 9.4 | 8.0 | | 11.4 | |
| MgO | 2.3 | 1.5 | | | |
| $Al_2O_3$ | 1.3 | | 2 | 5 | |
| $Fe_2O_3$ | .5 | | | | |
| $B_2O_3$ | | | 21 | | |
| PbO | | | | 0.6 | |
| ZnO | | | | | 13 |

Examples of slags which can be used between the die and the workpiece are given in Tables 2 and 3. Table 2 is illustrative of slags which are most suitable where the extrusion temperature is relatively high, whereas Table 3 illustrates slags which are most suitable where the extrusion temperature is somewhat lower.

Table 2

| | (1) | (2) | (3) | (4) | (5) | (6) | (7) |
|---|---|---|---|---|---|---|---|
| $SiO_2$ | 72 | 80 | 57 | 35 | 35 | 45 | 50 |
| $K_2O$ | 1 | | 14 | | | | |
| $Na_2O$ | 11 | 5 | | | | | |
| CaO | 10 | | | | | 40 | 20 |
| MgO | 2 | | | | | | 10 |
| $Al_2O_3$ | 2 | 1 | | | | | 7 |
| $Fe_2O_3$ | 1 | 1 | | | | | |
| MnO | 1 | | | | 35 | | 6 |
| $B_2O_3$ | | 12 | 2 | 10 | | | |
| $As_2O_3$ | | 1 | | 5 | | 10 | |
| BaO | | | 27 | 42 | | | |
| ZnO | | | | 8 | | | |
| FeO | | | | | 30 | | 4 |
| $CaF_2$ | | | | | | 5 | |
| $TiO_2$ | | | | | | | 3 |

Table 3

| | (8) | (9) |
|---|---|---|
| $P_2O_5$ | 53 | |
| $B_2O_3$ | 3 | |
| BaO | 37 | |
| $Al_2O_3$ | 2 | |
| $SiO_2$ | | 27 |
| PbO | | 73 |

The invention is not limited to the preferred embodiments which have been given for purpose of illustration but may be otherwise embodied and practiced within the scope of the following claims.

What we claim is:

1. In a method of extruding a metal workpiece having a melting point about 900° C. from an extrusion chamber having a die at one end, the die having an opening through which the workpiece is extruded and a ledge surrounding the die opening, the steps comprising placing a separate preformed plate of substantial thickness of glass-like lubricating material which has a wide viscosity range at and is incombustible at the extrusion temperature and therefore has a melting range as contrasted with a true melting point on the ledge around the die opening, said material being of such a dimension as to cover the major portion of said ledge and having a viscosity temperature range starting at a temperature under that of the heat and pressure of the extrusion and ending at a temperature high enough to provide for layer melting during the entire extrusion operation, heating the workpiece and introducing it into the extrusion chamber, extruding the workpiece at such rate that the surface of said plate of lubricating material which is adjacent the workpiece melts continuously and under the pressure employed flows continuously through the die opening around the article being extruded while the opposite surface of said plate of lubricating material remains substantially solid.

2. In a method of extruding a metal workpiece having a melting point above 900° C. from an extrusion chamber having a die at one end, the die having an opening through which the workpiece is extruded and a ledge surrounding the die opening, the steps comprising placing a layer of solid glass of substantial thickness on the ledge around the die opening of a dimension covering the major portion of said ledge, heating the workpiece and introducing it into the extrusion chamber, extruding the workpiece at such rate that the surface of the glass layer which is adjacent the workpiece melts continuously and under the pressure employed flows continuously through the die opening around the article being extruded while the opposite surface of the glass layer remains substantially solid.

3. In a method of extruding a metal workpiece having a melting point above 900° C. from an extrusion chamber having a die at one end, the die having an opening through which the workpiece is extruded and a ledge surrounding the die opening, the steps comprising placing a separate preformed glass plate of substantial thickness around the die opening covering the major portion of said ledge, heating the workpiece and introducing it into the extrusion chamber, extruding the workpiece at such rate that the surface of the glass plate which is adjacent the workpiece melts continuously and under the pressure employed flows continuously through the die opening around the article being extruded while the opposite surface of the glass plate remains substantially solid.

JACQUES SEJOURNET.
LOUIS LABATAILLE.

REFERENCES CITED

The following references are of record in the file of this patent:

UNITED STATES PATENTS

| Number | Name | Date |
| --- | --- | --- |
| 319,918 | Mathieu | June 9, 1885 |
| 567,410 | Potter | Sept. 8, 1896 |
| 1,683,437 | Batie | Sept. 4, 1928 |
| 2,038,215 | Gillis | Apr. 21, 1936 |

FOREIGN PATENTS

| Number | Country | Date |
| --- | --- | --- |
| 16,463 | Great Britain | 1902 |